US009024924B2

(12) United States Patent
Imai et al.

(10) Patent No.: US 9,024,924 B2
(45) Date of Patent: May 5, 2015

(54) DISPLAY APPARATUS AND METHOD OF CONTROLLING DISPLAY APPARATUS

(71) Applicant: Seiko Epson Corporation, Tokyo (JP)

(72) Inventors: Shun Imai, Matsumoto (JP); Yoshihito Hayashi, Matsumoto (JP); Takashi Otome, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 13/738,074

(22) Filed: Jan. 10, 2013

(65) Prior Publication Data

US 2013/0207942 A1 Aug. 15, 2013

(30) Foreign Application Priority Data

Feb. 14, 2012 (JP) ................. 2012-029843

(51) Int. Cl.
*G09G 5/00* (2006.01)
*H04N 9/31* (2006.01)
*G09G 3/00* (2006.01)

(52) U.S. Cl.
CPC ............. *G09G 5/003* (2013.01); *G09G 5/006* (2013.01); *G09G 2320/103* (2013.01); *G09G 2350/00* (2013.01); *G09G 2370/042* (2013.01); *G09G 2370/047* (2013.01); *G09G 2370/10* (2013.01); *H04N 9/3179* (2013.01); *G09G 3/002* (2013.01)

(58) Field of Classification Search
None
See application file for complete search history.

(56) References Cited

U.S. PATENT DOCUMENTS

| | | | |
|---|---|---|---|
| 2004/0140971 A1* | 7/2004 | Yamazaki et al. | 345/204 |
| 2008/0205519 A1* | 8/2008 | Goodart et al. | 375/240.12 |
| 2008/0231711 A1* | 9/2008 | Glen et al. | 348/192 |
| 2008/0303785 A1 | 12/2008 | Yun | |
| 2010/0128231 A1 | 5/2010 | Furui | |
| 2012/0036284 A1* | 2/2012 | Tao et al. | 710/16 |

FOREIGN PATENT DOCUMENTS

JP 2010-130225 A 6/2010

* cited by examiner

*Primary Examiner* — Joseph Haley
*Assistant Examiner* — Emily Frank
(74) *Attorney, Agent, or Firm* — ALG Intellectual Property, LLC (57) ABSTRACT

When image data which does not satisfy set conditions is input from a device which outputs the image data, a display apparatus performs normal display. The display apparatus includes a display unit which displays an image based on the image data input from the PC, a connection control unit which executes connection control of setting transmission conditions including transmission line capacity of the image data to be output from the PC by transmitting and receiving control information to and from the PC, and an input data determination unit which determines whether or not the image data to be input from the PC satisfies the transmission conditions, after the connection control. When the image data to be input from the PC does not satisfy the transmission conditions, the connection control unit requests re-execution of the connection control with respect to the PC.

8 Claims, 4 Drawing Sheets

DISPLAY APPARATUS AND METHOD OF CONTROLLING DISPLAY APPARATUS

BACKGROUND

1. Technical Field

The present invention relates to a display apparatus that displays an image based on image data to be input from another apparatus, and a method of controlling a display apparatus.

2. Related Art

In the related art, an advanced interface which is based on an advanced standard such as DISPLAYPORT (trademark, hereinafter referred to as DP) standard or the like is proposed as an interface which connects an apparatus which outputs image data and a display apparatus. This kind of interface includes a function of transmitting and receiving various items of information such as image data transmission conditions, between the display apparatus and the other apparatus, to perform settings mutually. Accordingly, it is advantageous that the conditions of transmitting the image data can be suitably set without performing complicated setting operation by a user. For example, there is an example of performing mounting on a personal computer (for example, see JP-A-2010-130225).

When the display apparatus is connected to the other apparatus through the interface of the related art, there is a problem in that image data different from the set conditions is input to the display apparatus after completing the setting, in a case of malfunction of the apparatus or a failure of storage of set information. In this case, a display state of the display apparatus may be distorted, and a satisfactory display quality may not be obtained. In addition, in order to solve the problem described above, it was necessary for a user to perform a complicated setting operation again.

SUMMARY

An advantage of some aspects of the invention is to perform normal display when image data which does not satisfy set conditions is input, by a display apparatus which is connected to a source apparatus which outputs image data to be capable of transmitting and receiving control information.

An aspect of the invention is directed to a display apparatus which is connected to a source device which outputs image data, the apparatus including: an interface through which the display apparatus is connected to the source device, the interface is based on a predetermined standard; a display unit that displays an image based on image data input from the source device; a connection control unit that executes connection control of setting transmission conditions including transmission line capacity of the image data to be output from the source device by transmitting and receiving control information to and from the source device; a determination unit that determines whether or not the image data to be input from the source device satisfies the transmission conditions, after the connection control; and a request unit that requests a re-execution of the connection control with respect to the source device, when the determination unit determines that the image data to be input from the source device does not satisfy the transmission conditions.

According to the aspect of the invention, after performing the connection control with the source device, when image data which does not satisfy the transmission conditions set by the connection control is input from the source device, the re-execution of the connection control can be performed. Accordingly, even when a malfunction of the source device occurs, it is possible to normalize the operation of the source device by performing re-execution of the connection control without degrading display quality, and it is possible to display a normal image.

Another aspect of the invention is directed to the display apparatus described above, wherein the interface is an interface which is based on DP standard, and the connection control unit executes link training defined by the DISPLAYPORT standard as the connection control between the display apparatus and the source device, and sets the number of lanes to be used for main link which is used in transmitting image data and data transmission rates of each lane as the transmission conditions.

According to this aspect of the invention, when image data which does not satisfy the number of lanes to be used for the main link and the data transmission rate of each lane set by the link training is input from the source device to the display apparatus, it is possible to perform the re-execution of the link training to perform normal display.

Still another aspect of the invention is directed to the display apparatus described above, wherein the determination unit determines whether or not the image data satisfies the transmission conditions, by comparing the number of lanes to be used for the main link and the data transmission rates of each lane set by the link training, and the transmission line capacity necessary for transmitting the image data input from the source device.

According to this aspect of the invention, it is possible to rapidly and reliably determine whether or not the image data input from the source device satisfy the transmission conditions.

Yet another aspect of the invention is directed to the display apparatus described above, wherein, when the determination unit determines that the image data to be input from the source device does not satisfy the transmission conditions, and prior to this, the number of request times for a re-execution of the connection control by the request unit reaches a predetermined limited number of times, the request unit does not request a re-execution of the connection control with respect to the source device.

According to this aspect of the invention, when the improvement is not realized even by repeating the operation of requesting the re-execution of the connection control due to the physical malfunction or the like, unnecessary operations can be prevented.

Still yet another aspect of the invention is directed to the display apparatus described above, wherein the request unit includes a function of counting the number of times requested a re-execution of the connection control, and in a case of physical disconnection between the display apparatus and the source device, or in a case where the re-execution of the connection control is performed under the control of the source device, the counted number of times requested for the re-execution of the connection control is reset.

According to this aspect of the invention, by determining a case where the repeating of the re-execution of the connection control is effective, and a case where it is not effective, the control can be effectively performed.

Further another aspect of the invention is directed to the display apparatus described above, wherein, before the determination unit determines whether or not the image data to be input from the source device satisfies the transmission conditions, the display unit does not display an image based on the image data input from the source device.

According to this aspect of the invention, since the image which does not satisfy the transmission conditions is not displayed, it is possible to prevent the degradation of the display quality.

Still further another aspect of the invention is directed to the display apparatus described above, wherein, when the image data to be input from the source device is moving image data, and the determination unit determines that the image data to be input from the source device does not satisfy the transmission conditions, the display unit displays a still image generated from the image data input from the source device.

According to this aspect of the invention, even when the moving image data to be input from the source device does not satisfy the transmission conditions, it is possible to inform the user about the content of the image data.

Yet further another aspect of the invention is directed to a method of controlling a display apparatus which is connected to a source device which outputs image data, through an interface which is based on a predetermined standard, the method including: executing connection control of setting transmission conditions including transmission line capacity of the image data to be output from the source device by transmitting and receiving control information to and from the source device; determining whether or not the image data to be input from the source device satisfies the transmission conditions, after the connection control; and requesting a re-execution of the connection control with respect to the source device, when it is determined that the image data to be input from the source device does not satisfy the transmission conditions.

According to this aspect of the invention, when the image data which does not satisfy the transmission conditions set by the connection control is input from the source device after the connection control with the source device, the re-execution of the connection control can be performed. Accordingly, even when a malfunction of the source device occurs, it is possible to normalize the operation of the source device by performing re-execution of the connection control without degrading display quality, and it is possible to display a normal image.

According to the aspects of the invention, even when a malfunction of the source device occurs, it is possible to normalize the operation of the source device by performing re-execution of the connection control without degrading display quality, and it is possible to display a normal image.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Hereinafter, embodiments in which the invention is applied will be described by referring to the drawings.

Figure 1:
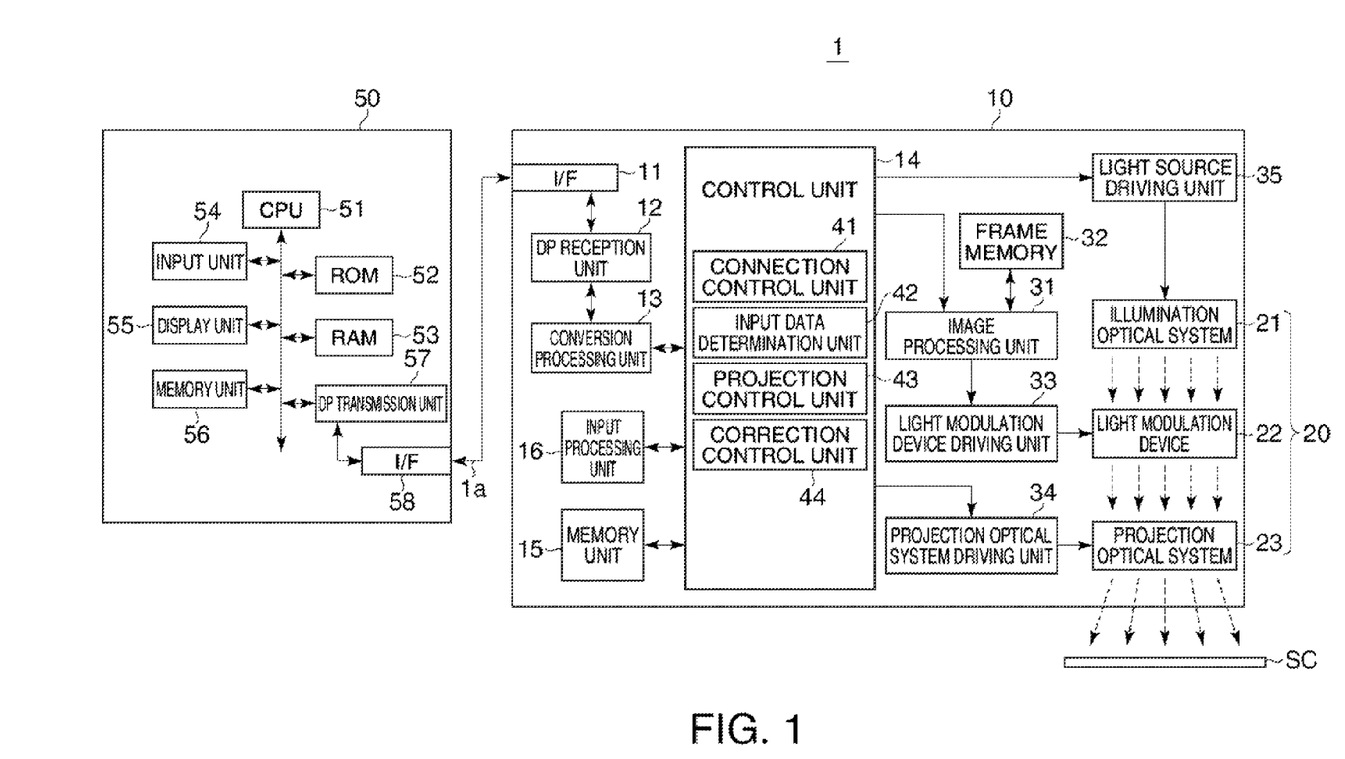
FIG. 1 is a block diagram of functions of a projector and a PC configuring a projection system.

FIG. 1 is a block diagram showing a functional configuration of a projector 10 and a PC (personal computer) 50 configuring a projection system 1 according to an embodiment. The projection system 1 shown in FIG. 1 is configured by connecting the PC 50 as an image supplying apparatus which supplies an image, to the projector 10 as a display apparatus which projects an image on a screen SC (projecting surface).

The projector 10 is connected to a computer such as the PC 50 or an external image supplying apparatus (not shown) such as various image player through a cable 1a and I/F (interface) 11, and projects an image based on digital image data to be input to the interface 11 on the screen SC.

The projector 10 is mainly formed of a projection unit 20 (display unit) which performs formation of an optical image and an image processing system which electrically processes an image signal input to the projection unit 20. The projection unit 20 is configured of an illumination optical system 21, a light modulation device 22 (modulation unit), and a projection optical system 23 (projection unit). The illumination optical system 21 includes a light source which is formed of a xenon lamp, an extra high pressure mercury lamp, an LED (Light Emitting Diode), a laser light source and the like. In addition, the illumination optical system 21 may include a reflector and an auxiliary reflector which guides light emitted by the light source to the light modulation device 22, or may include a lens group (not shown) for improving optical properties of projected light, a polarizing plate, or a light modulating element which reduces an amount of light emitted by the light source on a path to approach the light modulation device 22. A light source driving unit 35 which drives the light source of the illumination optical system 21 according to control of a control unit 14 is connected to the illumination optical system 21.

The light modulation device 22 receives a signal from an image processing system which will be described later, and modulates light emitted by the illumination optical system 21 to obtain image light. As a detailed configuration of the light modulation device 22, for example, a method of using three transmissive or reflective liquid crystal light valves corresponding to each color of RGB, is used. The light modulation device 22 is driven by a light modulation device driving unit 33 which will be described later, and changes a transmittance of light of each of pixels disposed in a matrix on each liquid crystal panel to form an image.

The light emitted by the illumination optical system 21 is separated into each of colored light of R, G, and B by a dichroic mirror or the like, and enters the liquid crystal panel of each color included in the light modulation device 22. Each of colored light is modulated by the liquid crystal panel of each color, and then, colored light items are combined by a cross dichroic prism to be guided to the projection optical system 23.

The projection optical system 23 includes a lens group or the like for projecting and focusing the entered light modulated by the light modulation device 22 on the screen SC. In addition, the projection optical system 23 includes a motor or the like for adjusting an amount of projection light with an aperture, and is connected with projection optical system driving unit 34 which drives the motor or the like according to control by the control unit 14.

The projector 10 includes a zooming adjustment lever (not shown) or a focus adjustment lever (not shown), and by an operation of the levers, lens included in the projection optical system 23 is moved, and zooming in and out, and focus adjusting of a projected image on the screen SC are performed.

The image processing system is configured of the control unit 14 as a main unit, which collectively controls the entire projector 10, and includes a memory unit 15 which stores data which is to be processed by the control unit 14 and a control program which is to be executed by the control unit 14, a input processing unit 16 which detects an operation with a remote control or an operating panel, an image processing unit 31 which processes image data, and the light modulation device driving unit 33 which drives the light modulation device 22 based on an image signal output from the image processing unit 31 to perform rendering.

The control unit 14 controls each of units of the projector 10 by reading out and executing the control program stored in the memory unit 15. The control unit 14 detects contents of an operation performed by a user, based on operation information input from the input processing unit 16, and controls the image processing unit 31, the light modulation device driving unit 33, the projection optical system driving unit 34 and the light source driving unit 35 according to the operation, to project an image on the screen SC.

The input processing unit 16 receives and decodes a radio signal transmitted by a remote control (not shown) which operates the projector 10, and includes a function of detecting the operation performed by the remote control and a function of detecting a bottom operation of the operation panel (not shown) of the projector 10. The input processing unit 16 generates and outputs an operation signal showing the operation of the remote control and the operation panel, to the control unit 14. In addition, the input processing unit 16 controls the lighting state of an indicator lamp of the operation panel (not shown) according to an operating state or a setting state of the projector 10 under the control of the control unit 14.

The interface 11 includes a terminal to which digital image data is input or an interface circuit, and includes a connector based on DISPLAYPORT (trademark) standard which is defined by VESA (Video Electronics Standards Association), in the embodiment. DISPLAYPORT (hereinafter, referred to as DP standard) referred herein includes Versions 1.0, 1.1a, and 1.2 currently defined, and the invention can be also applied to a subsequent standard and expanded standard which will be defined later. The interface 11 has a wired connection to an interface 58 included in the PC 50 which will be described later, by the cable 1a based on the DP standard.

In addition, the interface 11 includes an interface circuit based on the DP standard, and is connected to a DP reception unit 12 which transmits and receives data by executing a DP protocol. The interface 11 and the DP reception unit 12 correspond to a DP interface.

The DP reception unit 12 is connected to a conversion processing unit 13 which executes a scaling process of the image data to be input from the PC 50 through the interface 11. The conversion processing unit 13 executes a conversion process or the like of resolution of the image data, and outputs the processed image data to the control unit 14. In addition, in the projection system 1, the image data transmitted from the PC 50 to the projector 10 is considered to be moving image (video picture) data, but may be still image data.

The image processing unit 31 obtains image data output by the conversion processing unit 13 according to the control by the control unit 14, and determines attributes of the image data such as an image size, resolution, recognition whether the image is a still image or a moving image, a frame rate in the case of a moving image, and the like. Then, the image processing unit 31 develops the image in the frame memory 32 for each frame. In addition, the image processing unit 31 performs a resolution conversion process when the resolution of the obtained image data is different from the display resolution of the liquid crystal panel of the light modulation device 22, and performs an enlarging/contracting process when the zooming is indicated by the operation of the remote control or the operation panel, and the processed image is developed in the frame memory 32. After that, the image processing unit 31 outputs the image for each frame which is developed in the frame memory 32 to the light modulation device driving unit 33 as a display signal.

Meanwhile, the PC 50 includes a CPU 51 which executes a program to control each unit of the PC 50, a ROM 52 which stores a control program executed by the CPU 51 or data processed by the CPU in the control program in a non-volatile manner, a RAM 53 which temporarily stores the program executed or the data processed by the CPU 51, an input unit 54 which detects an input operation by the input device (not shown) such as a keyboard or a mouse, a display unit 55 which outputs the display signal to the display device (not shown) such as a liquid crystal display to display the processed result by the CPU 51 or an image for operation, and a memory unit 56 which stores an application program executed by the CPU 51 or various data items in a non-volatile manner.

In addition the PC 50 includes a DP transmission unit 57 and the interface 58 as an interface for output which outputs the image data.

The CPU 51 reads out and executes the control program stored in the ROM 52, and performs initialization of each unit of the PC 50. After that, the CPU 51 realizes various functions by reading out and executing the application program stored in the memory unit 56 according to the input operation of the input unit 54. For example, the CPU 51 outputs image data generated by executing the application program by the CPU 51, image data stored in the memory unit 56, image data of an image displayed on a display device (not shown) by the display unit 55, image data obtained from an external memory medium or another apparatus, to the projector 10 according to the input operation of the input unit 54.

The interface 58 includes a connector based on the DP standard in the same manner as the interface 11. In addition, the interface 58 includes an interface circuit based on the DP standard, and is connected to a DP transmission unit 57 which transmits and receives data by executing a DP protocol. The DP transmission unit 57 and the interface 58 correspond to a DP interface.

The CPU 51 controls the DP transmission unit 57 to execute the link training which will be described later according to the DP protocol, establishes transmission line between the PC 50 and the projector 10, and transitions to a state capable of transmitting and receiving the image data. After that, the CPU 51 converts the image data to be output to the projector 10 into the image data of data format based on the DP standard, and outputs the data to the DP transmission unit 57. The DP transmission unit 57 transmits the image data input from the CPU 51, from the interface 58 to the projector 10 through the cable 1a according to the DP protocol.

In the projection system 1 configured as described above, the control unit 14 included in the projector 10 realizes functions of a connection control unit 41, an input data determination unit 42, a projection control unit 43, and a correction control unit 44, by executing the control program stored in the memory unit 15.

The connection control unit 41 (connection control unit and request unit) detects that the PC 50 is connected to the interface 11 through the cable 1a, and executes link training according to the DP protocol as will be described later. In the projection system 1 of the embodiment, the PC 50 and the projector 10 correspond to a source device and a sink device, respectively.

The DP interface includes a hot plug detection channel which detects connection with a partner device, an auxiliary (AUX) channel which transmits the control data, and a main link which transmits data such as image data. The main link is configured of a plurality of Serdes lanes. For example, in DISPLAYPORT Version 1.2, four lanes can be used, and a lane to be used can be selected from three of lane 1, lane 2, and lane 4, according to resolution and data transmission rate of the image data to be transmitted. In addition, a bandwidth of each lane (data transmission rate) can be set as three stages of 1.62 Gbps, 2.7 Gbps, and 5.4 Gbps. Accordingly, a maximum value of the transmission line capacity is 21.6 Gbps in a case of using the lane 4 at 5.4 Gbps.

In the link training, the device on the transmission side (source side) and the device on the reception side (sink side) which are connected through the DP interface to each other, transmit and receive data such as EDID (Enhanced Display Identification Data), and DPCD (DISPLAYPORT Configuration Data), to determine the number of lanes to be used for transmission of the image data, and the data transmission rate of each lane. The EDID includes information such as a vendor name, product name, and a version, definition of video input, maximum display resolution, a basic display parameter such as a gamma value, color properties such as chromaticity or white point, timing information and the like of the projector 10. The DPCD includes set values regarding to the resolution of the image data which can be received by the projector 10, the transmission line capacity thereof and the like.

Figure 2:
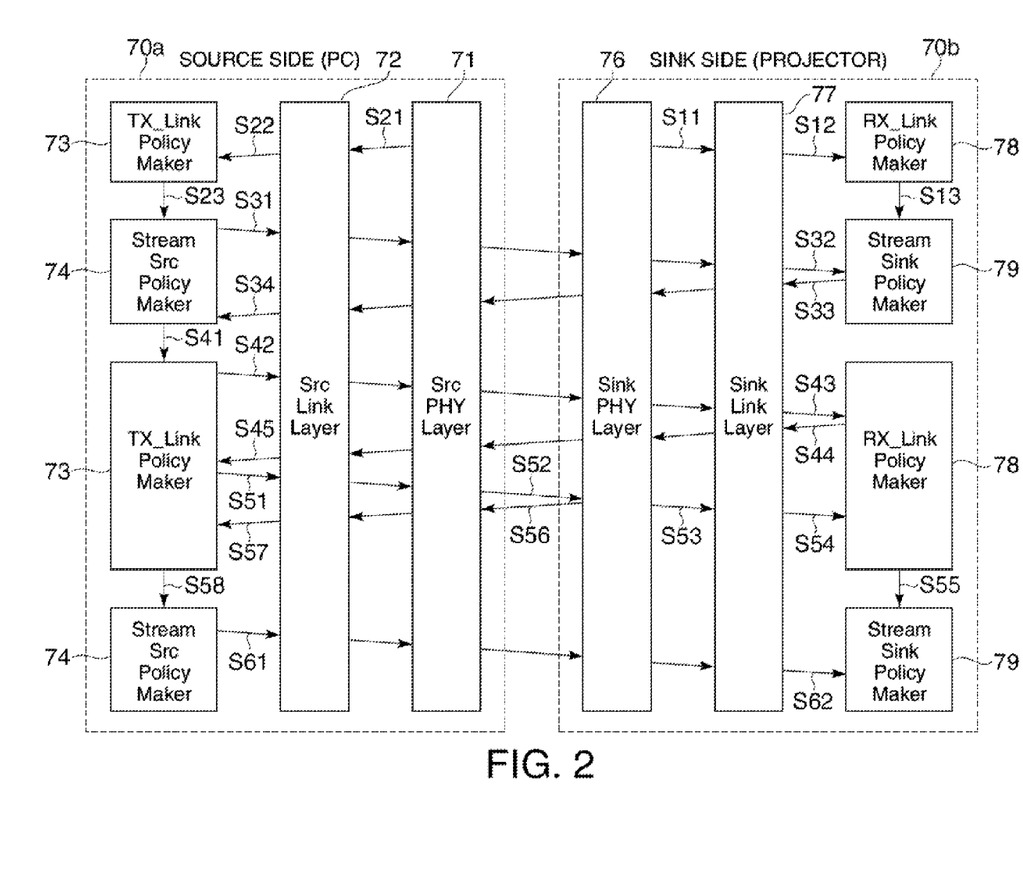
FIG. 2 is a sequence diagram showing link training of a DP protocol.

FIG. 2 is a sequence diagram of the link training.

A source side block 70a on a side for outputting the image data shown in FIG. 2 is configured of the CPU 51, the DP transmission unit 57, and the interface 58, and a sink side block 70b on a side for inputting the image data is configured of the control unit 14, the DP reception unit 12, and the interface 11. In addition, each of functional blocks included in the source side block 70a and the sink side block 70b can be realized by the software which is executed by the CPU 51 and the connection control unit 41, or may be realized by the hardware of FPGA or the like.

The functions of the source side block 70a is configured of a source side physical layer 71, a source side link layer 72, a source side link policy maker 73, and a source side stream policy maker 74. Meanwhile, the functions of the sink side block 70b is configured of a sink side physical layer 76, a sink side link layer 77, a sink side link policy maker 78, and a sink side stream policy maker 79.

The link training starts with detecting that the source side block 70a and the sink side block 70b are connected to each other through the hot plug detection channel. When the projector 10 and the PC 50 are connected to each other by the cable 1a (FIG. 1), the sink side physical layer 76 detects the connection of the source device (step S11), and the sink side link layer 77 notifies the connection thereof to the sink side link policy maker 78 (step S12). The sink side link policy maker 78 notifies the connection detection to the sink side stream policy maker 79 (step S13).

Meanwhile, when the source side physical layer 71 detects the connection of the sink device (step S21), the source side link layer 72 notifies the connection of the sink device to the source side link policy maker 73 (step S22), and the source side link policy maker 73 notifies the connection detection to the source side stream policy maker 74 (step S23).

The source side stream policy maker 74 generates a read-out request of the EDID, and transmits the request to the sink side block 70b through the source side link layer 72 and the source side physical layer 71 (step S31). In the sink side block 70b, the sink side stream policy maker 79 receives the read-out request of the EDID (step S32), and transmits the EDID according to the request (step S33). The EDID is transmitted to the source side block 70a through the sink side link layer 77 and the sink side physical layer 76. In the source side block 70a, the source side stream policy maker 74 obtains the EDID (step S34) and then outputs a link connection request to the source side link policy maker 73 (step S41).

The source side link policy maker 73 transmits a read-out request of the DPCD to the sink side block 70b according to the link connection request of the source side stream policy maker 74 (step S42). In the sink side block 70b, the sink side link policy maker 78 receives the read-out request of the DPCD (step S43) and transmits the DPCD according to the request (step S44). Herein, the source side link policy maker 73 obtains the DPCD transmitted by the sink side link policy maker 78 (step S45).

The source side link policy maker 73 and the source side stream policy maker 74 determine transmission conditions including the number of lanes to be used and the data transmission rate, based on the EDID and DPCD obtained from the sink side block 70b and perform a process to check for that the data transmission with the transmission conditions is possible or not. That is, the source side link policy maker 73 transmits a packet for checking for the transmission conditions and the communication state (step S51), a communication test is performed between the source side physical layer 71 and the sink side physical layer 76 based on the packet for the checking (step S52), and then the result of the communication test is notified from the sink side physical layer 76 (step S53). The sink side link policy maker 78 obtains the result of the communication test and the transmission conditions (step S54), and notifies the connection establishment to the sink side stream policy maker 79 (step S55). Accordingly, the sink side stream policy maker 79 transitions to a state capable of receiving the image data.

In addition, the result of the communication test is notified from the sink side physical layer 76 to the source side block 70a (step S56), and the source side link policy maker 73 obtains the result thereof (step S57) and notifies the connection establishment to the source side stream policy maker 74 (step S58).

After that, the source side stream policy maker 74 executes the transmission of the image data (step S61), and the image data is received by the sink side stream policy maker 79 (step S62).

As described above, the link training is executed in order of four steps as follows.

1. Hot plug detection (steps S11 to S23)
2. Obtaining of EDID (steps S31 to S34)
3. Obtaining of DPCD (steps S41 to S45)
4. Determination of Transmission Conditions and Checking for Communication State (steps S51 to S58)

Then, the transmission conditions are determined by the link training, the transmission conditions are set in the source device and the sink device, and the image data is transmitted according to the transmission conditions.

However, even when the link training is normally completed, in some cases, the source device outputs image data which does not satisfy the transmission conditions set by the link training. For example, the image data in a bandwidth which exceeds the transmission line capacity set by the link training is output, in some cases. In this case, in the sink device, it is difficult to perform the normal reception of the image data and the degraded image is displayed. In order to avoid this problem, the projector 10 includes a function of determining and treating that whether the image data to be input after the link training satisfies the transmission conditions set by the link training.

The connection control unit 41 included in the control unit 14 detects the connection with the PC 50 through the hot plug detect channel, executes the link training, and stores the transmission conditions (number of lanes to be used and data transmission rate of each lane) determined by the link training to the memory unit 15, to set as the subsequent transmission conditions.

In addition, the input data determination unit 42 (determination unit) detects the bandwidth of the image data to be input through the interface 11 after the link training, and determines whether or not that the data satisfies the transmission conditions set by the connection control unit 41.

Figure 3:
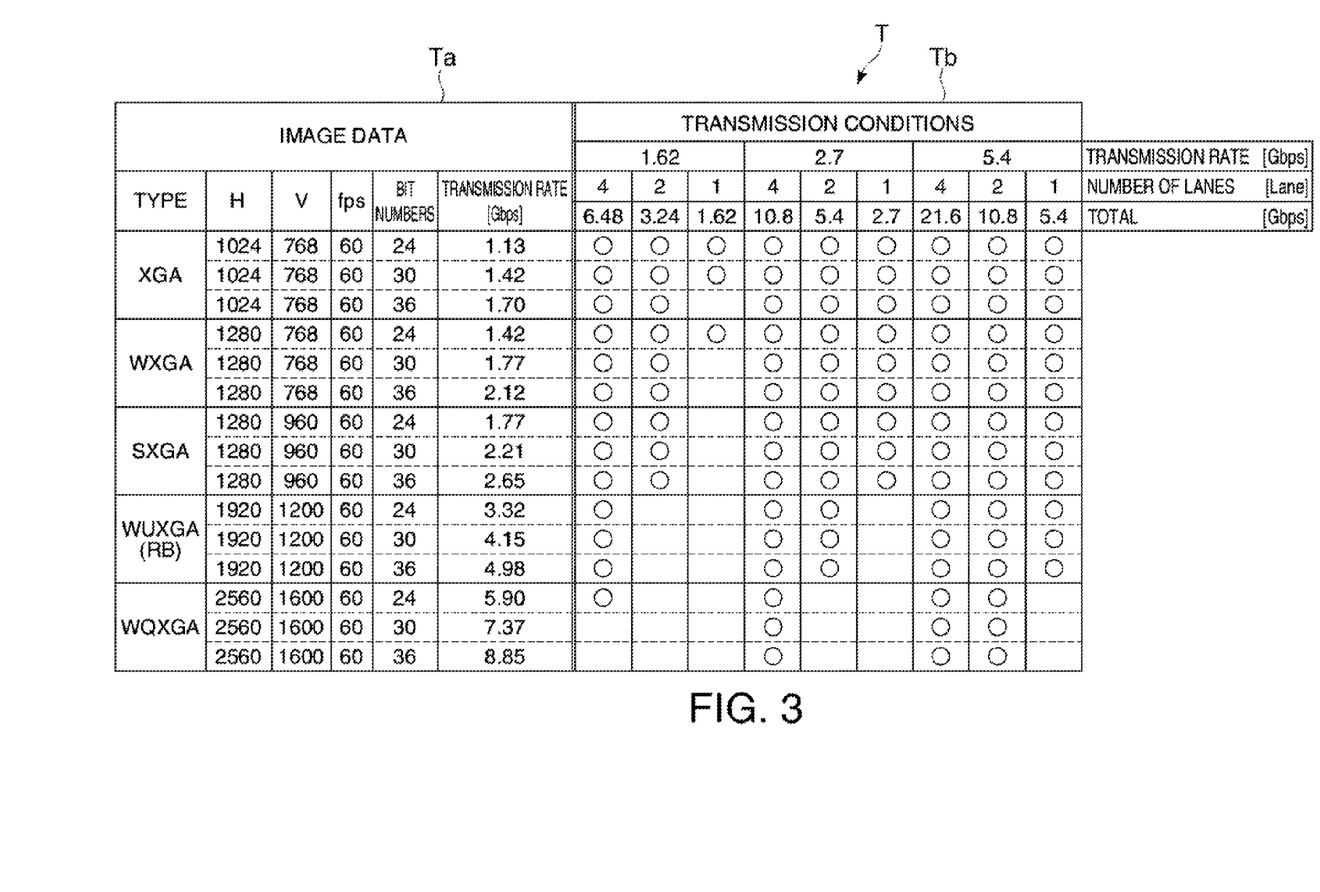
FIG. 3 is an explanatory view showing an example of conditions for determining suitability of image data.

FIG. 3 is an explanatory view showing examples of the conditions used for determining suitability of the image data by the input data determination unit 42, in a form of a table.

The table T shown in FIG. 3 is configured of a table Ta in which formats of image data (image signal) and necessary transmission line capacity are defined, and a table Tb in which each format defined in the table Ta is determined whether or not to satisfy the transmission conditions. The table T is stored in the memory unit 15, and the control unit 14 can refer to the table as necessary, for example.

In the table Ta, examples of formats of typical image data items are classified into a data type, horizontal resolution (H), vertical resolution (V), a frame rate (fps), and bit numbers for each pixel. The transmission line capacity which is obtained from the formats of the image data items is corresponded.

For example, the transmission line capacity necessary for transmitting the image data of XGA (1024×768) at 60 fps, and with 24 bits is obtained as 1.13 Gbps. In the same manner, the transmission line capacity necessary for transmitting the image data of WQXGA (2560×1600) at 60 fps, with 30 bits is 7.37 Gbps.

The transmission conditions which can be used in the projector 10 are listed in the table Tb. In the examples of FIG. 3, the transmission line capacity is defined by corresponding to each of combination of data transmission rate (three stages of 1.62 Gbps, 2.7 Gbps, and 5.4 Gbps) and number of lanes to be used (three of the lane 1, the lane 2, and the lane 4). The transmission line capacity can be obtained according to the number of lanes to be used and the data transmission rate. The transmission conditions of the table Tb do not correspond to all transmission conditions defined by the DP standard, but are defined only by the data transmission rate and the number of lanes to which the projector 10 can correspond. For example, in a case where the projector 10 does not correspond to a data transmission rate of 5.4 Gbps, only cases of a data transmission rate of 1.62 Gbps and of 2.7 Gbps are set in the table Tb. Also in the table Ta, only formats (resolution, frame rate, or bit numbers) which can be displayed by the projector 10 are set.

The input data determination unit 42 specifies the resolution, the frame rate, and the bit numbers of the image data input through the interface 11, and obtains the necessary transmission line capacity based on the table Ta. For example, when the transmission conditions are set as 1.62 Gbps, and the lane 1, the transmission line capacity is 1.62 Gbps from the table Tb. In this case, when the image data of XGA (1024×768) at 60 fps with 36 bits is input, the transmission line capacity necessary for transmitting the image data is 1.70 Gbps from the table Ta. In this example, since the transmission line capacity of the input image data exceeds the capacity of the set transmission conditions, it is determined not to satisfy the transmission conditions. In the table Tb, the suitability of the image data (O for a suitable example) is already defined for each format set in the table Ta and transmission conditions of table Tb. Accordingly, the input data determination unit 42 can determine the suitability of image data, only by searching the table Ta for a format of input imaged data, searching the table Tb for a set transmission conditions, and referring to the definition of the suitability.

In addition, in the example of FIG. 3, the example in which the transmission line capacity is obtained according to the resolution, the frame rate, and bit numbers of the image data, and the capacity is compared with the capacity according to the data transmission rate and the number of the lanes to be used has been described, however, a result determined in addition to the overhead due to encoding may be set in the table Tb.

Further, in a case where image data with a format which is not set in the table Ta (resolution, frame rate, bit numbers or the like) is input, the input data determination unit 42 may calculate the necessary transmission line capacity for each time, based on the format of the detected image data.

When the input data determination unit 42 determines that the image data input through the interface 11 does not satisfy the transmission conditions set by the link training, the connection control unit 41 of FIG. 1 requests the re-execution of the link training to the PC 50. When the request is received by the transmission unit 57, the CPU 51 starts the link training shown in FIG. 2. In this case, the source side physical layer 71 and the sink side physical layer 76 may execute a process from the operation of detecting the connection (steps S11 and S21), or may execute from a process in which the source side link policy maker 73 notifies the connection detection to the source side stream policy maker 74 (step S23), or a process in which the source side stream policy maker 74 transmits the read-out request of EDID (step S31).

Accordingly, the link training is performed again, and the PC 50 sets the transmission conditions again. Accordingly, in a case where the image data which does not satisfy the transmission conditions is output due to a failure of the setting of the transmission conditions in the PC 50 or the like, the failure is solved and the normal image data is transmitted.

In addition, the connection control unit 41 counts the number of request times for the re-execution for each time when requesting for the re-execution of the link training to the PC 50. The limited value is set for the number of request times for the re-execution, in advance. Accordingly, in a case where a state in which the input data determination unit 42 determines that the image data does not to satisfy the transmission conditions is continued, and the several request times occurred, the counted value is incremented for each time. When the counted value reaches the limit, the connection control unit 41 ends the process without requesting for the re-execution of the link training.

Accordingly, in a case where a failure which is difficult to be solved by the re-execution of the link training occurred, it is not necessary to repeat unnecessary link training.

In addition, by operating the PC 50 by a user, or by a program preset in the PC 50, the PC 50 can perform the re-execution of the link training without the request from the projector 10. In this case, in the sequence of the link training shown in FIG. 2, the PC 50 may execute the process in which the source side stream policy maker 74 transmits the read-out request of the EDID (step S31). Ina case of receiving the read-out request of the EDID, the projector 10 may execute the process of transmitting the EDID according to the request (step S33).

As described above, in a case of performing the re-execution the link training under the control of the PC 50, the counted value of the re-execution which is counted by the connection control unit 41 is cleared (reset).

In addition, when it is determined that the image data input to the interface 11 satisfies the transmission conditions, after the re-execution of the link training, the counted value of the re-execution which is counted by the connection control unit 41 is cleared (reset).

Accordingly, since the re-execution of the link training is performed only in a case where the re-execution of the link training is considered to be effective by appropriately switching for whether or not it is a case where the re-execution of the link training is effective, there is no concern that the unnecessary re-execution of the link training is repeated.

Further, in the projector 10, in a case where the physical disconnection occurs in the transmission line between the projector and PC 50 including the cable 1a, the connection control unit 41 clears the counted value of the re-execution which is counted by the connection control unit 41. The physical disconnection occurs due to the breaking or pulling out of the cable 1a, or a malfunction of the source side physical layer 71 or the sink side physical layer 76. The disconnection described above can be detected by the function of the sink side physical layer 76 shown in FIG. 2. When the physical disconnection occurs, re-establishment by the operation of a user is performed, and if the connection is detected after that, since the re-execution of the link training is performed, it is suitable to clear the number of request times.

In addition, since the operation of the light modulation device driving unit 33 is controlled in response to the processes of the connection control unit 41, the input data determination unit 42, the projection control unit 43, the projection control unit 43 controls the projection performed by the projection unit 20.

In details, when the connection control unit 41 detects the connection to start the link training, the projection control unit 43 holds the projection unit 20 in a stopped state. This state includes cases in a state where the light source of the illumination optical system 21 is turned off, and in a state where the light source is turned on and the light modulation device 22 is not in a projection state (for example, the entire surface of the liquid crystal display panel is displaying black). When the link training performed by the connection control unit 41 is completed and the input data determination unit 42 determines that the image data satisfies the transmission conditions, the projection control unit 43 starts the projection performed by the projection unit 20.

In addition, when the input data determination unit 42 determines that the input image data does not satisfy the transmission conditions, the projection control unit 43 does not start the projection of the image data, but holds the projection unit 20 in a stopped state.

In addition, the correction control unit 44 calculates the inclination (projection angle) of the screen SC with respect to the projector 10 and the projection distance from the projector 10 to the screen SC, and executes a correction process such as a trapezoidal distortion correction. By controlling the image processing unit 31 and deforming the image to be developed in the frame memory 32, based on the calculated projection angle and projector distance, the correction control unit 44 corrects the distortion of the projected image on the screen SC to display a good rectangular image. In a case where the distortion of the projected image on the screen SC is detected, or in a case where the correction execution is indicated by the operation of the operation panel (not shown), the correction control unit 44 calculates an projection angle and a projector distance to calculate new parameters for correction, and executes a process for correcting the projected image according to the calculated parameters.

Figure 4:
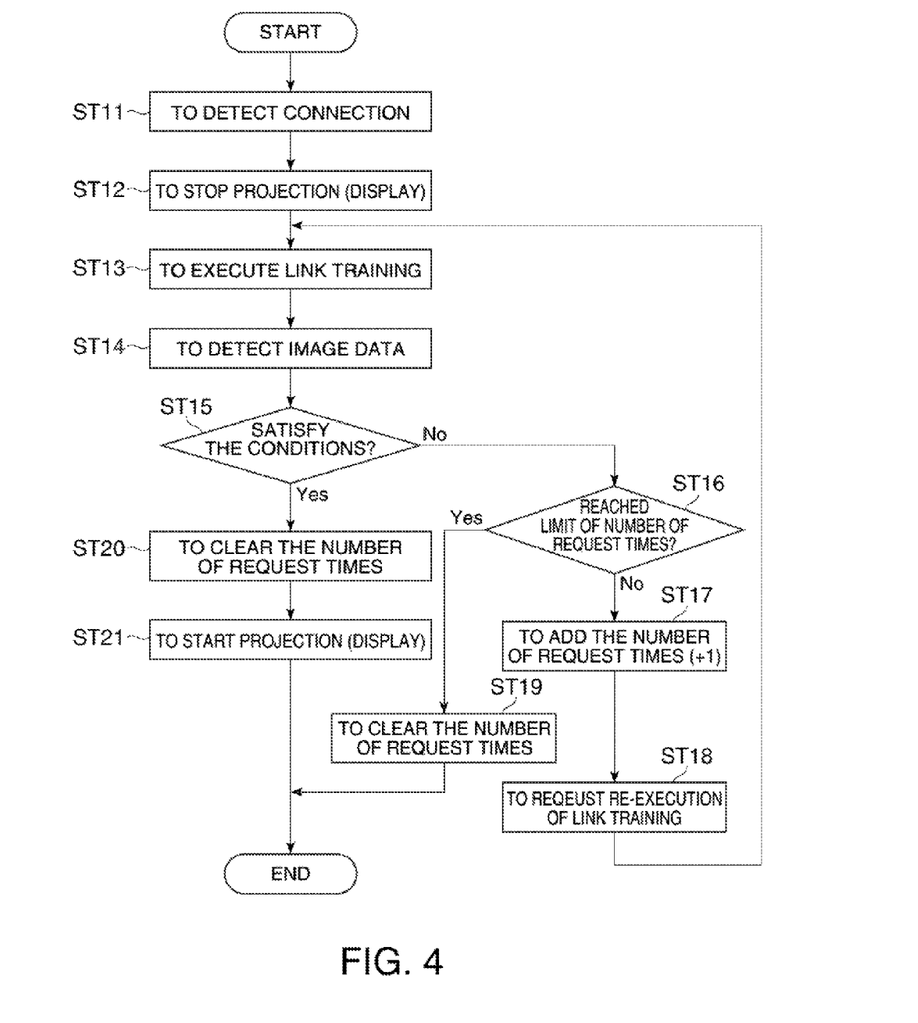
FIG. 4 is a flowchart showing an operation of a projector.

FIG. 4 is a flowchart showing the operation of the projector 10.

As shown in FIG. 4, first, when the connection control unit 41 detects the connection through the cable 1a (step ST11), the projection control unit 43 stops the projection performed by the projection unit 20 (step ST12). Herein, when the projection unit 20 is not performed the projection in advance, the projection control unit 43 holds the projection unit 20 in a stopped state.

When the connection control unit 41 executes the link training and sets the transmission conditions (step ST13), and then the image data is input through the interface 11, the input data determination unit 42 detects the resolution, the frame rate, the bit numbers and the like of the image data (step ST14).

The input data determination unit 42 determines whether or not the input image data satisfies the transmission conditions set by the link training, according to the table T (step ST15).

When it is determined that the image data does not satisfy the transmission conditions (step ST15; No), the connection control unit 41 refers the counted value of the number of request times for re-execution of the link training and determines whether or not the counted value reaches the limit (step ST16). Herein, when the counted value does not reach the limited value (step ST16; No), the connection control unit 41 adds (+1) the counted value of the number of request times (step ST17), requests for the re-execution of the link training with respect to the projector 10 (step ST18), and returns to step ST13.

In addition, when the counted value of the number of request times reaches the limited value (step ST16; Yes), the connection control unit 41 clears the counted value of the request times (step ST19) and ends the process.

Meanwhile, when it is determined that the image data satisfies the transmission conditions (step ST15; Yes), the connection control unit 41 clears the counted value of the number of request times (step ST20), the projection control unit 43 starts the projection performed by the projection unit 20 based on the input image data (step ST21) and ends the process.

As described above, the projector 10 according to the embodiment to which the invention is applied is connected to the PC 50 which outputs the image data, through the interface which is based on predetermined standard, and includes the projection unit 20 which displays the image based on the image data input from the PC 50, the connection control unit 41 which transmits and receives the control information to and from the PC 50, and executes the connection control of setting the transmission conditions including the transmission line capacity of the image data to be output from the PC 50, and the input data determination unit 42 which determines whether or not the image data to be input from the PC 50 satisfies the transmission conditions after the connection control. Additionally, since when the input data determination unit 42 determines that the image data to be input from the PC 50 does not satisfy the transmission conditions, the connection control unit 41 requests for the re-execution of the connection control to the PC 50, after performing the connection control with the PC 50, when the image data which does not satisfy the transmission conditions set by the connection control is input from the PC 50, the re-execution of the connection control can be performed. Accordingly, even when the malfunction or the like of the PC 50 occurs, the normal operation of the PC 50 can be performed by the re-execution of the control and the normal image can be displayed without degrading of the image quality.

In addition, the interface included in the projector 10 is the interface based on the DP standard, and since the connection control unit 41 executes the link training defined by the DP standard as the connection control and sets the number of lanes to be used for the main link used for transmitting of the image data and the data transmission rate of each lane as the transmission conditions, when the image data which does not satisfy the transmission conditions set by the link training is input, the link training is re-executed to normalize the operation of the PC 50, and the normal display can be performed.

Further, by comparing the number of lanes to be used for the main link and the data transmission rate of each lane set by the link training, with the transmission line capacity necessary for transmitting the image data input from the PC 50, the input data determination unit 42 can rapidly and reliably determines the satisfaction thereof with the transmission conditions.

In addition, since the projection unit 20 does not display the image based on the image data input from the PC 50 before the input data determination unit 42 determines whether or not the image data to be input from the PC 50 satisfies the transmission conditions, it is possible to prevent the degradation of the display quality without displaying the distorted image.

When the input data determination unit 42 determines that the image data to be input from the PC 50 does not satisfy the transmission conditions, and prior to this, the number of times requested by the connection control unit 41 for the re-execution of the link training reaches the predetermined limited number of times, since the connection control unit 41 does not request for the re-execution of the connection control with respect to the PC 50, that is, since the unnecessary link training is not repeated for the failure such as the physical breakdown which is difficult to be solved by the re-execution of the link training, the connection control unit can efficiently perform the control.

In addition, the connection control unit 41 includes a function of counting the number of times requested for the re-execution of the link training, and in a case of the physical disconnection with the PC 50, or in a case where the re-execution of the connection control is performed under the control of the PC 50, since the counted number of request times is cleared, it is appropriately determined whether or not it is a case where the re-execution of the link training is effective, to perform the re-execution of the link training only in a case where the re-execution of the link training is considered to be effective. Accordingly, there is no concern that the unnecessary re-execution of the link training is repeated.

Since the projector 10 includes the illumination optical system 21 which includes the light source, the light modulation device 22 which modulates the light emitted by the illumination optical system 21 to generate the image light, and the projection optical system 23 which projects the image light generated by the light modulation device 22 on the screen SC, in a case where the image data to be input to the projector does not satisfy the transmission conditions, it is possible to prevent the distortion of the projected image.

Further, the projector 10 can execute the trapezoidal distortion correction and the like by the correction control unit 44. It is possible to prevent the great distortion of the projected image caused by the image data which does not satisfy the transmission conditions being input after performing the trapezoidal distortion correction. In addition, since it is possible to prevent the great distortion of the projected image, the correction control unit 44 does not automatically start the correction process, or the correction process which is started by a user's indication is not performed. Therefore it is possible to prevent the unnecessary correction process.

When the input data determination unit 42 determines that the input image data does not satisfy the transmission conditions (step ST15; No), the projection control unit 43 can have a configuration of not only holding the projection unit 20 in a non-displaying state, but also performing other display.

For example, in a case where the image data to be input through the interface 11 is a moving image data, the projection control unit 43 may extract one frame of the moving image data to generate the still image data (thumbnail image data) of low resolution, and the image may be projected by the projection unit 20 based on the thumbnail image data.

In this case, even when the moving image data to be input from the PC 50 does not satisfy the transmission conditions, it is possible to inform the user about the content of the image data.

Such display may be performed after the number of request times for re-execution of the link training reaches the limit (step ST16; Yes), for example.

In addition, when the input data determination unit 42 determines that the input image data does not satisfy the transmission conditions, or after the number of request times for the re-execution of the link training reaches the limit, the projection control unit 43 may execute blurring process for the input image data through a low pass filter and may project the image by the projection unit 20 based on the processed image data. In addition, the projection control unit 43 may generate the image data which is obtained by reducing the input image data, and may project the image by the projection unit 20 based on the processed image data. Also in the cases, it is possible to inform the user about the content of the image data without projecting the distorted image.

The embodiments described above are only examples of the detailed aspect to which the invention is applied, and the invention is not limited thereto. The invention can be applied as an aspect different from the embodiments described above. For example, in the embodiment, as the light modulation device, the configuration used with the three transmissive or reflective liquid crystal panels corresponding to each color of RGB has been described as an example, however the invention is not limited thereto, and may have a configuration of a method of combining one liquid crystal panel and color foil, a method of using three digital mirror devices (DMD) which modulate each colored light of RGB, or a method of combining one digital mirror device and a color foil. Herein, in a case of using only one liquid crystal panel or DMD as a display unit, a member corresponding to the combining optical system such as a cross dichroic prism is unnecessary. In addition, other than the liquid crystal panel and the DMD, any configurations can be employed as long as it is a configuration capable of modulating the light emitted by the light source.

The display apparatus according to the invention is not limited to the projector which projects the image on the screen SC. The image display apparatus also includes various display apparatuses such as a liquid crystal monitor or a liquid crystal television which displays an image/image on a liquid crystal display panel, and a self-light emitting display apparatus such as a monitor apparatus or a television receiver which displays an image/image on a PDP (plasma display panel), or a monitor apparatus or a television receiver which displays an image/image on an organic EL display panel which is called OLED (Organic light-emitting diode), OEL (organic electro-Luminescence) or the like. In this case, the liquid crystal display panel, the plasma display panel, and the organic EL display panel correspond to the display unit.

In addition, each functional unit shown in FIG. 1 shows the functional configuration of the projector 10 and the PC 50, and the detailed embodiment is not particularly limited. That is, it is not necessary to individually mount hardware which corresponds to each functional unit, and a configuration in which a plurality of functional units realizes functions by executing programs by one processor can be used. In addition, a part of functions to be realized with the software in the embodiment may be realized with the hardware, or a part of functions to be realized with the hardware may be realized with the software.

The entire disclosure of Japanese Patent Application No. 2012-29843, filed Feb. 14, 2012 is expressly incorporated by reference herein.

What is claimed is:

1. A display apparatus which is connected to a source device which outputs image data, the apparatus comprising:
    an interface through which the source device is connected to the display apparatus, the interface being based on a predetermined standard;
    a display unit that displays an image based on image data output from the source device;
    a connection control unit that executes connection control of setting transmission conditions by transmitting and receiving control information to and from the source device, the transmission conditions including a transmission line capacity of the image data to be output from the source device;
    a determination unit that determines, after the connection control, whether or not the image data to be output from the source device satisfies the transmission conditions; and
    a request unit that requests a re-execution of the connection control to the source device when the determination unit determines that the image data to be output from the source device does not satisfy the transmission conditions.

2. The display apparatus according to claim 1,
    wherein the interface is an interface which is based on a DISPLAYPORT standard, and
    the connection control unit executes link training defined by the DISPLAYPORT standard as the connection control between the display apparatus and the source device, and sets the number of lanes to be used for main link which is used in transmitting image data and data transmission rates of each lane as the transmission conditions.

3. The display apparatus according to claim 2,
    wherein the determination unit determines whether or not the image data satisfies the transmission conditions by comparing the number of lanes to be used for the main link and the data transmission rates of each lane set by the link training with the transmission line capacity necessary for transmitting the image data to be output from the source device.

4. The display apparatus according to claim 1,
    wherein, when the determination unit determines that the image data to be output from the source device does not satisfy the transmission conditions, and prior to this, the number of request times for a re-execution of the connection control by the request unit reaches a predetermined limited number of times, the request unit does not request a re-execution of the connection control with respect to the source device.

5. The display apparatus according to claim 4,
    wherein the request unit includes a function of counting the number of times requested for a re-execution of the connection control, and
    in a case of physical disconnection between the display apparatus and the source device, or in a case where the re-execution of the connection control is performed under the control of the source device, the counted number of times requested for the re-execution of the connection control is reset.

6. The display apparatus according to claim 1,
    wherein, before the determination unit determines whether or not the image data to be output from the source device satisfies the transmission conditions, the display unit does not display an image based on the image data output from the source device.

7. The display apparatus according to claim 1,
    wherein, when the image data to be output from the source device is moving image data and the determination unit determines that the image data to be output from the source device does not satisfy the transmission conditions, the display unit displays a still image generated from the image data output from the source device.

8. A method of controlling a display apparatus which is connected to a source device, which outputs image data, through an interface which is based on a predetermined standard, the method comprising:
    executing connection control of setting transmission conditions by transmitting and receiving control information to and from the source device, the transmission conditions including a transmission line capacity of the image data to be output from the source device;
    determining, after the connection control, whether or not the image data to be output from the source device satisfies the transmission conditions; and
    requesting a re-execution of the connection control to the source device when it is determined that the image data to be output from the source device does not satisfy the transmission conditions.

* * * * *